(12) United States Patent
Tsai

(10) Patent No.: US 7,933,077 B1
(45) Date of Patent: Apr. 26, 2011

(54) WIDE-ANGLE IMAGING LENS MODULE

(75) Inventor: Fei-Hsin Tsai, Wai Pu Hsiang (TW)

(73) Assignee: Newmax Technology Co., Ltd., Taichung County (TW)

( * ) Notice: Subject to any disclaimer, the term of this patent is extended or adjusted under 35 U.S.C. 154(b) by 0 days.

(21) Appl. No.: 12/636,535

(22) Filed: Dec. 11, 2009

(30) Foreign Application Priority Data

Nov. 27, 2009 (TW) .............................. 98140547 A

(51) Int. Cl.
*G02B 13/04* (2006.01)
*G02B 13/18* (2006.01)
*G02B 3/06* (2006.01)
*G02B 9/34* (2006.01)

(52) U.S. Cl. ..................... 359/753; 359/715; 359/781

(58) Field of Classification Search .................. 359/753, 359/781, 715, 771, 649, 650
See application file for complete search history.

(56) References Cited

U.S. PATENT DOCUMENTS

| 5,251,073 A | * | 10/1993 | Schauss | 359/715 |
| 6,775,074 B2 | * | 8/2004 | Kasahara | 359/781 |

* cited by examiner

*Primary Examiner* — Alicia M Harrington

(57) ABSTRACT

A wide-angle imaging lens module includes a fixed aperture diaphragm, a first lens, a second lens, a third lens and a fourth lens arranged from an object side to an image side in a sequence of: the first lens of a negative refractive power with a meniscus shape, having a concave surface on the image side and at least one aspheric surface; the diaphragm; the second lens of a positive refractive power, having a convex surface on the object side and at least one aspheric surface; the third lens of a negative refractive power, having a concave surface on the image side and at least one aspheric surface; the fourth lens of a positive refractive power, having a convex surface on the object side and at least one aspheric surface.

14 Claims, 6 Drawing Sheets

Non-point aberration and distorted aberration

Spherical surface aberration

Focal Length : f = 2.93 mm    $\frac{|f_1|}{|f_2|} = 2.131$    $\frac{|f_3|}{|f_4|} = 0.678$    $\frac{|f|}{|TL|} = 0.237$ (F NO.) : F 2.0

Viewing angle : 2ω= 75°    $\frac{|f_2|}{|f_3|} = 1.021$    $\frac{|f_{234}|}{|f|} = 1.183$

| Surf | Radius | Thickness | nd | vd |
|---|---|---|---|---|
| OBJ | Infinity | Infinity | | |
| 1 | 1.886459 | 0.7187609 | 1.535000 | 56.000000 |
| 2 | 1.016945 | 4.200774 | | |
| STO | Infinity | 0.01908604 | | |
| 4 | 3.339402 | 2.125504 | 1.535000 | 56.000000 |
| 5 | -2.007728 | 0.2861279 | | |
| 6 | 23.60905 | 0.9136756 | 1.632000 | 23.000000 |
| 7 | 1.556502 | 0.2100085 | | |
| 8 | 3.94221 | 1.119475 | 1.535000 | 56.000000 |
| 9 | -4.058177 | 0.17618 | | |
| 10 | Infinity | 0.3 | 1.516798 | 64.198266 |
| 11 | Infinity | 1.633667 | | |
| 12 | Infinity | 0.4 | 1.516798 | 64.198266 |
| 13 | Infinity | 0.308315 | | |
| IMA | Infinity | | | |

SURFACE DATA DETAIL:

| Surface 1 | | Surface 2 | |
|---|---|---|---|
| K : | -0.6146198 | K : | -1.006254 |
| A : | -0.010106976 | A : | 0.060844081 |
| B : | -0.005708809 | B : | -0.033722942 |
| C : | 0.0009053 | C : | 0.007104127 |
| D : | -0.000057497 | D : | -0.000419279 |
| Surface 4 | | Surface 5 | |
| K : | 0.3461966 | K : | -1.137714 |
| A : | -0.001022216 | A : | 0.033642622 |
| B : | -0.006259711 | B : | -0.015012369 |
| C : | 0.001409048 | C : | 0.0032876314 |
| D : | -0.000304312 | D : | -0.00044372438 |
| Surface 6 | | Surface 7 | |
| K : | -2000.118 | K : | -4.363315 |
| A : | -0.017644075 | A : | -0.011582248 |
| B : | -0.000401168 | B : | 0.010160552 |
| C : | 0.00076586 | C : | -0.001866108 |
| D : | -0.0001719 | D : | 0.000046567 |
| Surface 8 | | Surface 9 | |
| K : | -3.487159 | K : | -4.298831 |
| A : | 0.021437528 | A : | 0.041349307 |
| B : | 0.002518456 | B : | -0.006755363 |
| C : | -0.001183532 | C : | 0.002335105 |
| D : | 0.000037566 | D : | -0.000349896 |

FIG.1B

Non-point aberration and distorted aberration

Spherical surface aberration

Focal Length : f = 3.3 mm  $\quad \dfrac{|f_1|}{|f_2|} = 1.81 \quad \dfrac{|f_3|}{|f_4|} = 0.995 \quad \dfrac{|f|}{|TL|} = 0.259$ (F NO.) : F 2.0

Viewing angle : 2ω= 75°  $\quad \dfrac{|f_2|}{|f_3|} = 0.93 \quad \dfrac{|f_{234}|}{|f|} = 1.173$

| Surf | Radius | Thickness | nd | vd |
|---|---|---|---|---|
| OBJ | Infinity | Infinity | | |
| 1 | 1.7033 | 0.8390378 | 1.514000 | 57.000000 |
| 2 | 0.9135338 | 3.706143 | | |
| STO | Infinity | 0.1482096 | | |
| 4 | 3.479232 | 1.271429 | 1.531000 | 56.000000 |
| 5 | -3.107052 | 0.9403979 | | |
| 6 | -7.197962 | 0.5191897 | 1.607000 | 27.000000 |
| 7 | 3.15443 | 0.100706 | | |
| 8 | 5.068287 | 1.737979 | 1.514000 | 57.000000 |
| 9 | -2.54844 | 0.2 | | |
| 10 | Infinity | 0.4 | 1.516798 | 64.198266 |
| 11 | Infinity | 1.977578 | | |
| 12 | Infinity | 0.55 | 1.516798 | 64.198266 |
| 13 | Infinity | 0.35 | | |
| IMA | Infinity | | | |

SURFACE DATA DETAIL:

| Surface 1 | | Surface 2 | |
|---|---|---|---|
| K : | -0.824722 | K : | -1.004659 |
| A : | -0.007243472 | A : | 0.00848814 |
| B : | -0.004143371 | B : | -0.003220805 |
| C : | 0.000509941 | C : | -0.001095465 |
| D : | -0.000022114 | D : | 0.000465347 |
| Surface 4 | | Surface 5 | |
| K : | 0.3267742 | K : | -0.3973668 |
| A : | -0.003978079 | A : | 0.010922625 |
| B : | -0.000065584 | B : | -0.004098336 |
| C : | -0.000355423 | C : | 0.001068458 |
| D : | -0.000135817 | D : | -0.000327917 |
| Surface 6 | | Surface 7 | |
| K : | 7.014979 | K : | -1.985642 |
| A : | -0.029589321 | A : | -0.029310555 |
| B : | 0.005189232 | B : | 0.008247634 |
| C : | -0.001624725 | C : | -0.001102884 |
| D : | 0.000362547 | D : | 0.000073445 |
| Surface 8 | | Surface 9 | |
| K : | -18.94295 | K : | -0.5461109 |
| A : | 0.017918864 | A : | 0.007886902 |
| B : | -0.00047509 | B : | 0.000318595 |
| C : | -0.000342029 | C : | 0.00036748 |
| D : | 0.000050124 | D : | -0.000003862 |

FIG.2B

WIDE-ANGLE IMAGING LENS MODULE

BACKGROUND OF THE INVENTION

1. Field of the Invention

The present invention relates to the field of optical lenses, and more particularly to a four-piece imaging lens module capable of providing wider viewing angle and bigger diaphragm.

2. Description of the Prior Art

At present, digital carriers having a lens module, which has a function of photo-taking or filming, will increase its additional value and will attract young group. Some portable digital carriers such as digital cameras, mobile phones, NB, video players or Webcams are also provided with such lens modules. However, these portable digital carriers are small in size, thus imposing some limitations on the lens module. That is, the length of the lens module is inevitably limited.

Besides, the competitive market also results in the reduction of profit. In order to obtain product differentiation, the digital carriers are further provided with high level lens modules for marketing purposes. Preferably, the lens modules should provide wider viewing angle and bigger diaphragm.

However, the present wide-angle lens modules basically include five pieces of lens, which including a ply-lens. Nevertheless, such five-piece design is in conflict with the appeal of light, thin, short and small market trends. In other words, a lens module having five pieces of lens results in the increase of cost, weight, volume and thickness and cannot meet the consumers' needs.

As such, the present invention is arisen to obviate or at least mitigate the above mentioned disadvantages.

SUMMARY OF THE INVENTION

The main object of the present invention is to provide a four-piece lens module with wider viewing angle and bigger diaphragm.

To achieve the above and other objects, the wide-angle imaging lens module includes a first lens, a second lens, a third lens and a fourth lens, arranged from an object side to an image side in a sequence of: the first lens, the diaphragm, the second lens, the third lens and the fourth lens.

The first lens has a meniscus shape, a negative refractive power, a concave surface on the image side and at least one aspheric surface. The second lens has a positive refractive power, a convex surface on the object side and at least one aspheric surface. The third lens has a negative refractive power, a concave surface on the image side and at least one aspheric surface. The fourth lens has a positive refractive power, a convex surface on the object side and at least one aspheric surface.

Thereby, the lens amount, the weight, the volume and the thickness of the lens module are all reduced. Also, the coordination of the third and fourth lenses provides the lens module with high imaging quality and high resolving power.

The present invention will become more obvious from the following description when taken in connection with the accompanying drawings, which show, for purpose of illustrations only, the preferred embodiment(s) in accordance with the present invention.

BRIEF DESCRIPTION OF THE DRAWINGS

FIG. 1B is a schematic view showing the data of optical features and aspheric surface coefficients of an imaging lens module in accordance with a first preferred embodiment of the present invention;

FIG. 2B is a schematic view showing the data of optical features and aspheric surface coefficients of an imaging lens module in accordance with a second preferred embodiment of the present invention.

DETAILED DESCRIPTION OF THE PREFERRED EMBODIMENTS

Figure 1:
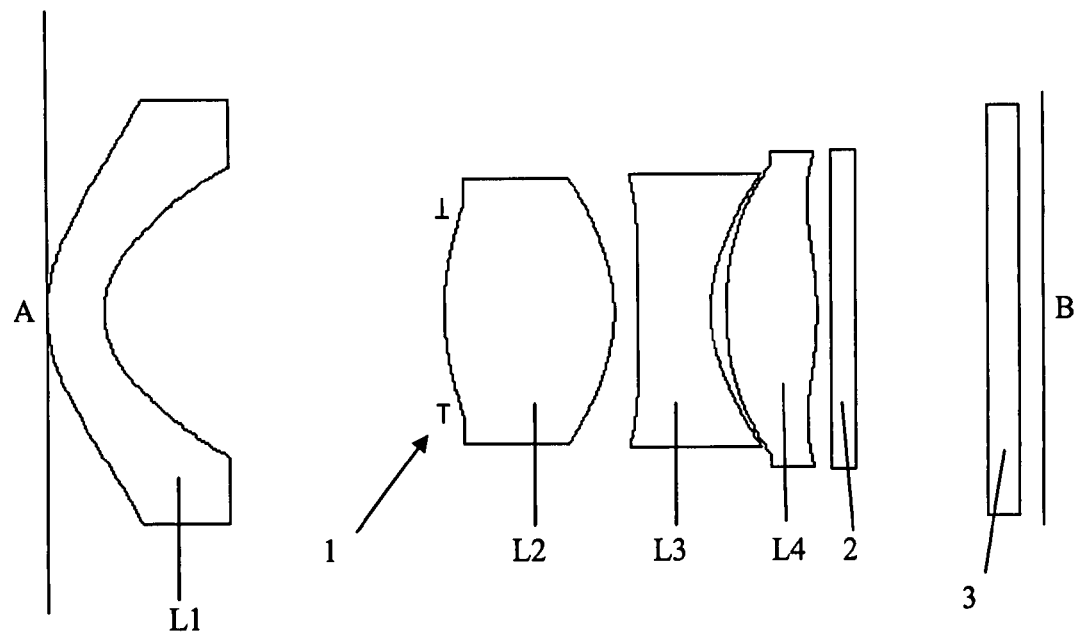
FIG. 1 is a schematic view showing an imaging lens module in accordance with a first preferred embodiment of the present invention.
Figure 2:
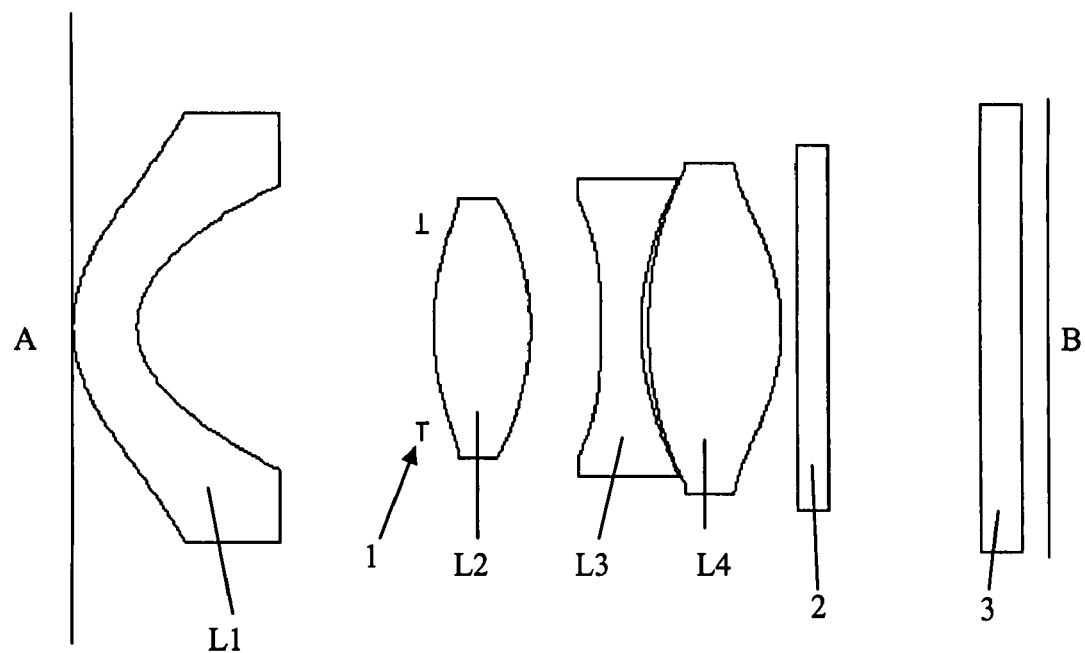
FIG. 2 is a schematic view showing an imaging lens module in accordance with a second preferred embodiment of the present invention.

FIGS. 1 and 2 show schematic views of lens modules in accordance with the first and second preferred embodiments of the present invention respectively. Each lens module includes a fixed aperture diaphragm 1 and an optical module, which includes a first lens L1, a second lens L2, a third lens L3 and a fourth lens L4. The diaphragm 1 and the optical module are arranged from an object side A to an image side B in a sequence of: the first lens L1, the diaphragm 1, the second lens L2, the third lens L3 and the fourth lens L4.

The first lens L1 has a meniscus shape, a negative refractive power, a concave surface on the image side B and at least one aspheric surface. The second lens L2 has a positive refractive power, a convex surface on the object side A and at least one aspheric surface. The third lens L3 has a negative refractive power, a concave surface on the image side B and at least one aspheric surface. The fourth lens L4 has a positive refractive power, a convex surface on the object side A and at least one aspheric surface.

In the optical module composed of four lenses in accordance to the system of the invention, a first plane glass 2 is disposed behind the fourth lens L4, having a filtering infrared effect. In addition, a second plane glass 3 is installed before the image side B for providing an effect of protecting the light sensor and used for image sensors of different packages and providing a better imaging quality. Further, the image side B refers to a light sensor for capturing images, and the light sensor is a CCD or a CMOS.

Each lens is made by a plastic material or a glass material, especially the first to the fourth lenses may all be plastic lenses with aspheric surface(s). The plastic material allows the lens to be shown in the structure with an aspheric surface, and the lens is used as an aspheric lens for providing a higher resolving power and reducing the number of lenses required for the imaging process, so as to achieve a good imaging quality of lens module.

Figure 1A:
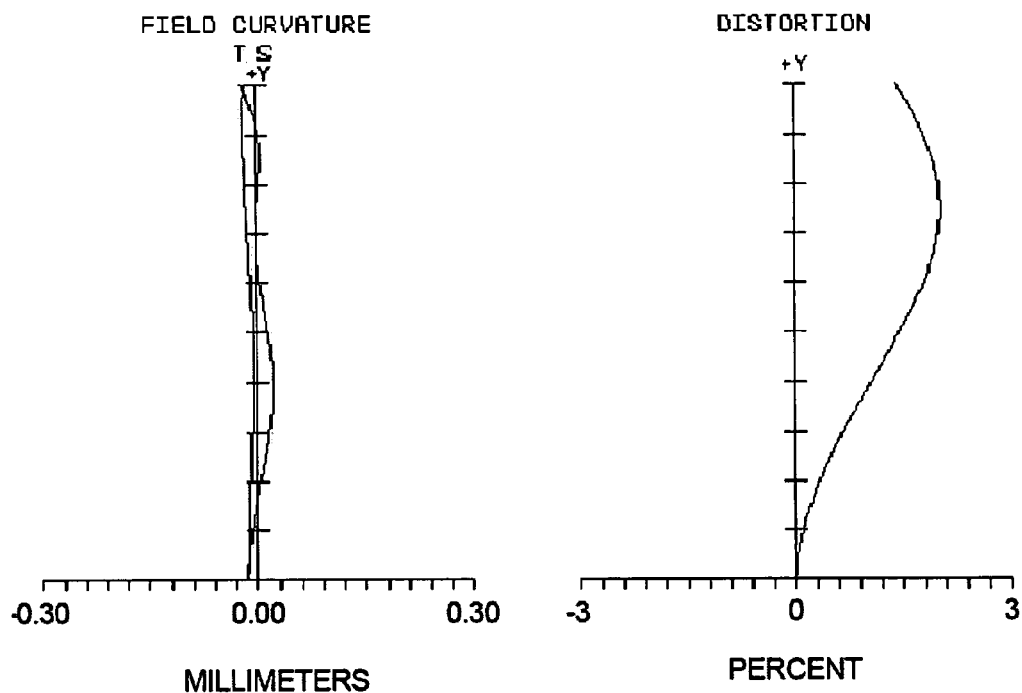
FIG. 1A is a schematic view showing the aberration of an imaging lens module in accordance with a first preferred embodiment of the present invention.
Figure 1A:
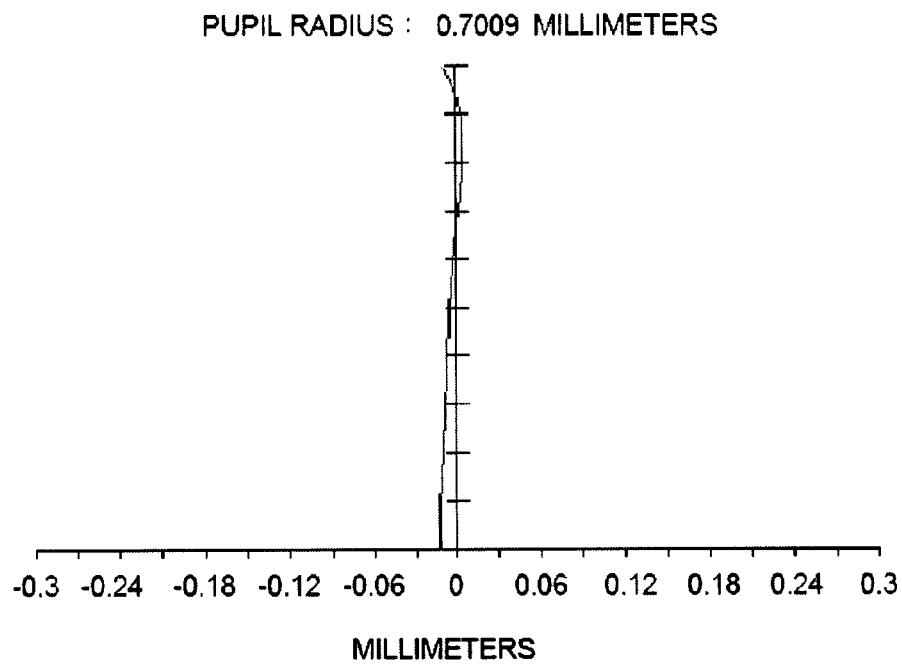
Figure 2A:
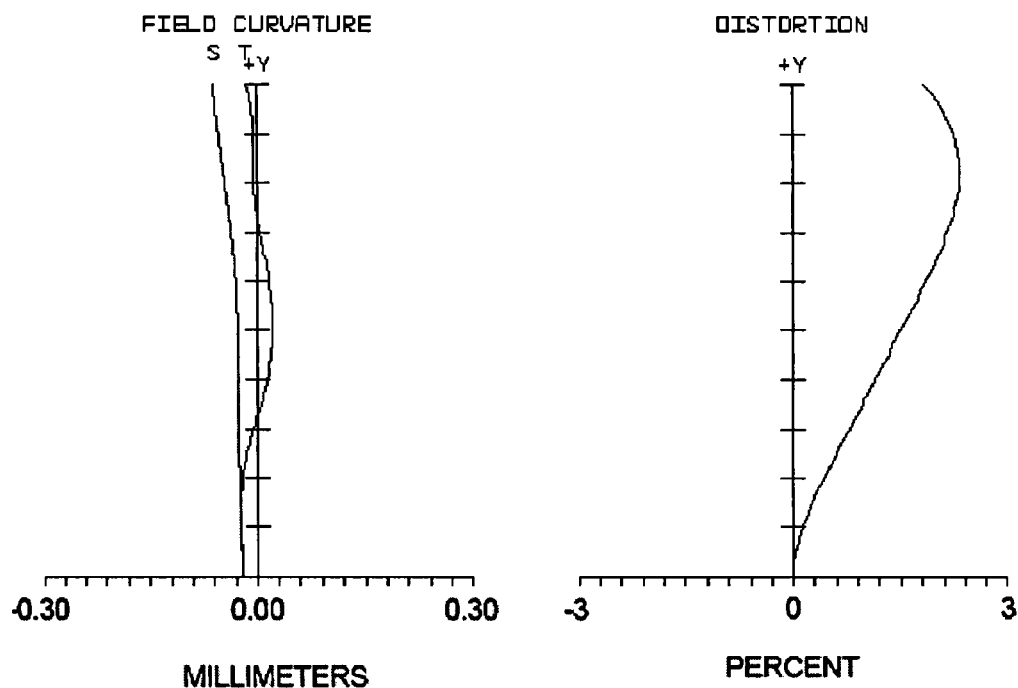
FIG. 2A is a schematic view showing the aberration of an imaging lens module in accordance with a second preferred embodiment of the present invention.
Figure 2A:
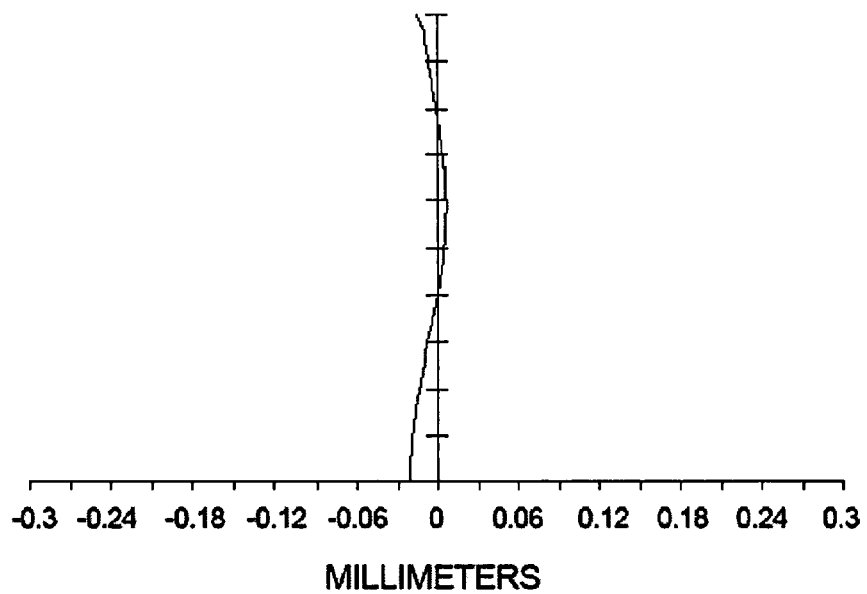

In addition, the schematic views of the aberration of the invention are non-point aberration, distorted aberration and spherical surface aberration as shown in FIG. 1A and FIG. 2A. Regardless of which aberration, the aberration relates to a data of a line d, and the non-point aberration relates to the data of an S image plane (SAGITTAL) which is related to the data of a T image plane (TANGENTIAL).

From the figures of the aberrations, the correction of the aberration of the invention is obtained completely from a simulated design, and thus there will be no problems in practical applications.

Refer to FIG. 1B and FIG. 2B for the data of aspheric surfaces in accordance with the first and second preferred embodiments of the invention, the data displayed at the top are numerals representing each lens or element of the optical module of the invention.

The value of F. No. shows the parameter of brightness. The smaller the value of F is, the higher the brightness is.

Viewing angle: 2ω.

Focal Length f: f is the overall focal length (mm) of the optical module, and 1, 2, 3, 4, 5, 6, 7, 8, 9, 10, 11, 12, 13 listed below are numbers of lenses counting in a sequence starting from the object side; the surface numbers 1, 2 represent two surfaces of the first lens L1, the surface numbers 4, 5 represent two surfaces of the second lens L2, the surface numbers 6, 7 represent two surfaces of the third lens L3, the surface numbers 8, 9 represent two surfaces of the fourth lens L4, and 10, 11, 12, 13 represent two surfaces of the first plane glass 2 and the second plane glass 3 respectively.

In the invention, the focal length value f1 of the first lens and the focal length value f2 of the second lens must satisfy the following relationship to achieve the best quality:

$$1.5 < |f1|/|f2| < 2.7$$

In the invention, the focal length value f2 of the second lens and the focal length value f3 of the third lens must satisfy the following relationship:

$$0.5 < |f2|/|f3| < 1.5$$

In the invention, the focal length value f3 of the third lens and the focal length value f4 of the fourth lens must satisfy the following relationship:

$$0.4 < |f3|/|f4| < 1.6$$

In the invention, the overall focal length value f234 of the second lens, the third lens and the fourth lens and the focal length value f of the whole lens module must satisfy the following relationship:

$$|f234|/|f| < 2$$

In order to achieve the best imaging quality, the refractive index N3 and the Abbe number V3 of the third lens must satisfy the following relationship:

$$N3 > 1.57, V3 < 40$$

Also, the focal length value f of the whole lens module and the distance TL between the first surface of the first lens and an imaging surface must satisfy the following relationship:

$$0.1 < |f/TL| < 0.5$$

If the above relationship is not satisfied, the performance, the resolving power and the yield rate of the lens module will be decreased.

Since every lens of the lens module has at least one aspheric surface, the shape of the aspheric surface must satisfy the condition of the following formula:

$$z = \frac{ch^2}{1 + [1 - (k+1)c^2h^2]^{0.5}} + Ah^4 + Bh^6 + Ch^8 + Dh^{10} + Eh^{12} + Gh^{14} + \ldots$$

Where, z is a value of a reference position with respect to a vertex of the surface along the optical axis and at a position with a height h; k is a conic constant; c is the reciprocal of a radius of curvature; and A, B, C, D, E, G, . . . are coefficients of high level aspheric surfaces.

In the four-piece imaging lens module of the present invention, the coordination of the first and second lenses and the coordination of the third and fourth lenses enable the lens module to obtain wider viewing angle, which has reached at least 75 degrees, and obtain better brightness performance, which has reached a brightness parameter of 2.0. Also, the resolving power of the lens module can be maintained. In addition, the coordination of the third and fourth lenses enables the lens module to have better image quality, less distortion rate, which is less than 3. Moreover, the miniaturization of the lens module can be achieved as well.

What is claimed is:

1. A wide-angle imaging lens module, comprising a fixed aperture diaphragm, a first lens, a second lens, a third lens and a fourth lens, arranged from an object side to an image side in a sequence of:
   the first lens, having a meniscus shape, a negative refractive power, a concave surface on the image side, and having at least one aspheric surface;
   the fixed aperture diaphragm;
   the second lens, having a positive refractive power, a convex surface on the object side, and having at least one aspheric surface;
   the third lens, having a negative refractive power, a concave surface on the image side, and having at least one aspheric surface;
   the fourth lens, having a positive refractive power, a convex surface on the object side, and having at least one aspheric surface.

2. The imaging lens module of claim 1, wherein $1.5 < |f1|/|f2| < 2.7$, and f1 is a focal length value of the first lens, f2 is a focal length value of the second lens.

3. The imaging lens module of claim 2, wherein $0.5 < |f2|/|f3| < 1.5$, and f2 is a focal length value of the second lens, f3 is a focal length value of the third lens.

4. The imaging lens module of claim 3, wherein $0.4 < |f3|/|f4| < 1.6$, and f3 is a focal length value of the third lens, f4 is a focal length value of the fourth lens.

5. The imaging lens module of claim 4, wherein $|f234|/|f| < 2$, and f234 is an overall focal length value of the second lens, the third lens and the fourth lens, f is a focal length value of the whole lens module.

6. The imaging lens module of claim 5, wherein $N3 > 1.57$, $V3 < 40$, and N3 is a refractive index of the third lens, V3 is an Abbe number of the third lens.

7. The imaging lens module of claim 6, wherein $0.1 < |f/TL| < 0.5$, and f is a focal length value of the whole lens module, TL is the distance between a first surface of the first lens and an imaging surface.

8. The imaging lens module of claim 7, wherein the aspheric surface is in a shape satisfying a formula of:

$$z = \frac{ch^2}{1 + [1 - (k+1)c^2h^2]^{0.5}} + Ah^4 + Bh^6 + Ch^8 + Dh^{10} + Eh^{12} + Gh^{14} + \ldots$$

and z is a value of a reference position with respect to a vertex of the surface along the optical axis and at a position with a height h; k is a conic constant; c is the reciprocal of a radius of curvature; and A, B, C, D, E, G, . . . are coefficients of high level aspheric surfaces.

9. The imaging lens module of claim 1, wherein $0.5 < |f2|/|f3| < 1.5$, and f2 is a focal length value of the second lens, f3 is a focal length value of the third lens.

10. The imaging lens module of claim 1, wherein $0.4 < |f3|/|f4| < 1.6$, and f3 is a focal length value of the third lens, f4 is a focal length value of the fourth lens.

11. The imaging lens module of claim 1, wherein $|f234|/|f| < 2$, and f234 is an overall focal length value of the second lens, the third lens and the fourth lens, f is a focal length value of the whole lens module.

12. The imaging lens module of claim 1, wherein $N3 > 1.57$, $V3 < 40$, and N3 is a refractive index of the third lens, V3 is an Abbe number of the third lens.

13. The imaging lens module of claim 1, wherein $0.1 < |f/TL| < 0.5$, and f is a focal length value of the whole lens module, TL is the distance between a first surface of the first lens and an imaging surface.

14. The imaging lens module of claim 1, wherein the aspheric surface is in a shape satisfying a formula of:

$$z = \frac{ch^2}{1 + [1 - (k+1)c^2h^2]^{0.5}} + Ah^4 + Bh^6 + Ch^8 + Dh^{10} + Eh^{12} + Gh^{14} + \ldots$$

and z is a value of a reference position with respect to a vertex of the surface along the optical axis and at a position with a height h; k is a conic constant; c is the reciprocal of a radius of curvature; and A, B, C, D, E, G, . . . are coefficients of high level aspheric surfaces.

* * * * *